(12) United States Patent
    Velusamy et al.

(10) Patent No.: US 11,076,437 B1
(45) Date of Patent: Jul. 27, 2021

(54) USER DATA USAGE MARKING AND TRACKING FOR A FIFTH GENERATION NEW RADIO (5GNR) ACCESS NODE AND A NON-5GNR ACCESS NODE

(71) Applicant: Sprint Communications Company L.P., Overland Park, KS (US)

(72) Inventors: Saravana Velusamy, Overland Park, KS (US); Ramesh Kalathur, Fairfax, VA (US); Manuprathap Manoharan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 25 days.

(21) Appl. No.: 16/737,595

(22) Filed: Jan. 8, 2020

(51) Int. Cl.
    *H04W 4/00*     (2018.01)
    *H04W 76/16*    (2018.01)
    *H04W 28/08*    (2009.01)
    *H04W 88/16*    (2009.01)

(52) U.S. Cl.
    CPC .......... *H04W 76/16* (2018.02); *H04W 28/08* (2013.01); *H04W 88/16* (2013.01)

(58) Field of Classification Search
    USPC .................................................. 370/329, 328
    See application file for complete search history.

(56) References Cited

U.S. PATENT DOCUMENTS

| 9,927,807 | B1* | 3/2018 | Ganjoo | ................ H04W 76/15 |
| 10,282,719 | B1 | 5/2019 | Paczkowski et al. | |
| 10,469,516 | B2 | 11/2019 | Hampel et al. | |
| 2017/0048127 | A1 | 2/2017 | Almodovar Chico et al. | |
| 2018/0139622 | A1* | 5/2018 | Cornforth | ............. H04W 24/00 |
| 2019/0069229 | A1* | 2/2019 | Lee | ........................ H04W 88/06 |
| 2019/0182850 | A1* | 6/2019 | Wang | ................ H04W 72/1215 |
| 2019/0253937 | A1* | 8/2019 | Hsieh | ..................... H04W 76/27 |
| 2019/0261444 | A1* | 8/2019 | Axmon | .................. H04W 76/28 |
| 2019/0313380 | A1* | 10/2019 | Ye | ........................ H04W 24/00 |
| 2019/0320368 | A1* | 10/2019 | Li | ........................ H04W 36/125 |
| 2019/0364417 | A1 | 11/2019 | Patil et al. | |
| 2020/0322850 | A1* | 10/2020 | Zhu | ................... H04W 36/0022 |

FOREIGN PATENT DOCUMENTS

| CN | 102301767 B | 12/2011 |
| WO | 2017213433 A1 | 12/2017 |
| WO | 2018001522 A1 | 1/2018 |
| WO | 2018001538 A1 | 1/2018 |

\* cited by examiner

*Primary Examiner* — David Q Nguyen

(57) ABSTRACT

A wireless communication system serves User Equipment (UE) over a Fifth Generation New Radio (5GNR) access point and a non-5GNR access point. The non-5GNR access point exchanges attachment signaling with the UE and exchanges network signaling with a network controller. The network controller exchanges bearer signaling with a data gateway. The data gateway marks Downlink (DL) user data as non-5GNR DL user data and transfers the non-5GNR DL user data to the non-5GNR access point. The data gateway marks additional DL user data as 5GNR DL user data and transfers the 5GNR DL user data to the 5GNR access point. The non-5GNR access point receives and wirelessly transfers the non-5GNR DL user data to the UE. The 5GNR access point receives and wirelessly transfers the 5GNR DL user data to the UE. The data gateway tracks the transferred amount of the non-5GNR DL user data and 5GNR DL user data.

20 Claims, 8 Drawing Sheets

USER DATA USAGE MARKING AND TRACKING FOR A FIFTH GENERATION NEW RADIO (5GNR) ACCESS NODE AND A NON-5GNR ACCESS NODE

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless signals transport user data and network signaling. The wireless access nodes exchange the user data and network signaling with other network elements to help deliver the wireless data services. Exemplary wireless communication networks include Fifth Generation New Radio (5GNR) networks and Long Term Evolution (LTE) networks.

Some wireless user devices have both LTE radios and 5GNR radios. These dual 5GNR/LTE user devices can wirelessly communicate with both 5GNR access nodes and LTE access nodes at the same time. Thus, hybrid 5GNR/LTE networks transfer user data to 5GNR/LTE user devices over dual 5GNR/LTE links using both 5GNR access nodes and LTE access nodes. The bearer setup and modification for exchanging user data between the data network elements (e.g., a Serving Gateway (S-GW), Packet Gateway (P-GW), or User Plane Function (UPF)) over a network controller (e.g., a Mobility Management Entity (MME), Session Management Function (SMF), or Access and Mobility Management Function (AMF)) remains fairly simple and rigid for the 5GNR access node and the LTE access node. Unfortunately, MME/AMF/SMF and S-GW/P-GW/UPF do not efficiently and effectively determine whether the 5GNR/LTE user devices are exchanging data with the hybrid 5GNR/LTE network using the 5GNR access point or the LTE access point. Moreover, the MME/AMF/SMF and S-GW/P-GW/UPF cannot intelligently track Uplink (UL) user data and Downlink (DL) user data for a 5GNR/LTE user device communicated over the 5GNR access point or the LTE access point.

Technical Overview

A wireless communication system serves User Equipment (UE) over a Fifth Generation New Radio (5GNR) access point and a non-5GNR access point. The non-5GNR access point exchanges attachment signaling with the UE and responsively exchanges network signaling with a network controller. The network controller exchanges the network signaling with the non-5GNR access point and exchanges bearer signaling with a data gateway. The data gateway exchanges the bearer signaling with the network controller. The data gateway marks Downlink (DL) user data for the UE as non-5GNR DL user data and transfers the non-5GNR DL user data to the non-5GNR access point. The data gateway marks additional DL user data for the UE as 5GNR DL user data and transfers the 5GNR DL user data to the 5GNR access point. The non-5GNR access point receives the non-5GNR DL user data and wirelessly transfers the non-5GNR DL user data to the UE. The 5GNR access point receives the 5GNR DL user data and wirelessly transfers the 5GNR DL user data to the UE. The data gateway tracks the transferred amount of the non-5GNR DL user data for the UE and the transferred amount of 5GNR DL user data for the UE.

DETAILED DESCRIPTION

Figure 1:
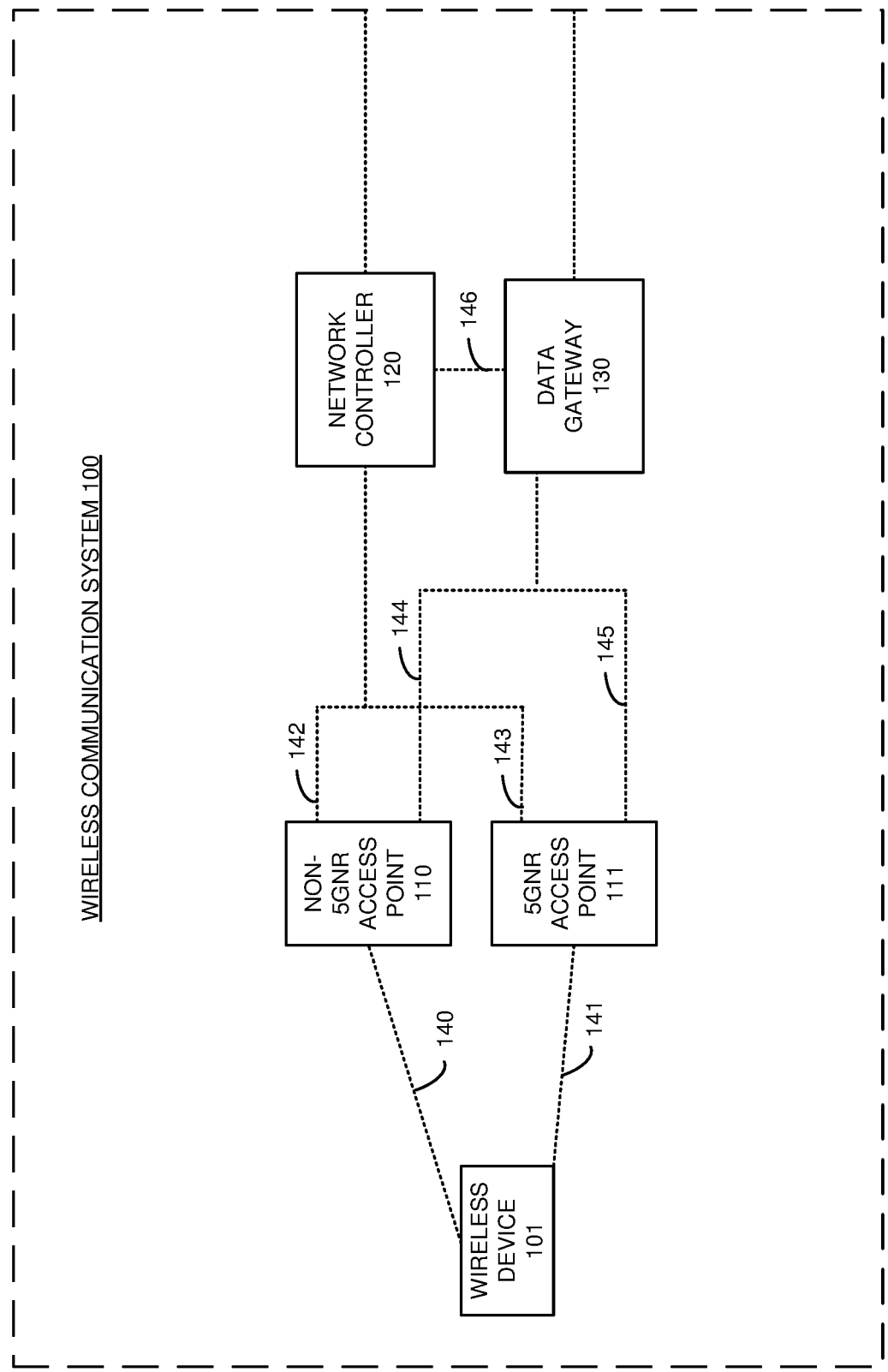
FIG. 1 illustrates a wireless communication system to serve a User Equipment (UE) over a Fifth Generation New Radio (5GNR) access point and a non-5GNR access point.

FIG. 1 illustrates wireless communication system to serve User Equipment (UE) over a Fifth Generation New Radio (5GNR) access point and a non-5GNR access point. Wireless communication system 100 comprises User Equipment (UE) 101, non-5GNR access point 110, 5GNR access point 111, network controller 120, and data gateway 130. Wireless communication network 100 serves UE 101 with data services like media-conferencing, social-networking, media-streaming, machine communications, and internet access.

UE 101 is coupled to non-5GNR access point 110 over non-5GNR link 140. UE 101 is coupled to 5GNR access point 111 over 5GNR link 141. Network controller 120 is coupled to non-5GNR access point 110 over non-5GNR link 142. Network controller 120 is coupled to 5GNR access point 111 over link 143. Network gateway 130 is coupled to non-5GNR access point 110 over link 144. Network gateway 130 is coupled to 5GNR access point 111 over link 145. Network controller 120 is coupled to data network gateway 130 over data link 146.

UE 101 may transfer communications to network controller 120 over non-5GNR access point 110 and 5GNR access point 111. UE 101 could be a computer, phone, vehicle, sensor, robot, display, headset, or some other user apparatus that uses Long Term Evolution (LTE), 5GNR, Institute of Electrical and Electronic Engineers 802.11 (WIFI), or some other wireless network protocol. UE 101 comprises radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

Non-5GNR access point 110 could be an LTE eNodeB, a WIFI hotspot, and the like. 5GNR access point 111 could be 5GNR gNodeB. Access points 110-111 each comprise transceiver circuitry and processing circuitry. The transceiver circuitry comprises antennas, modulators, amplifiers, filters, digital/analog interfaces, microprocessors, memory, and bus connections. The processing circuitry comprises microprocessors, memory, user interfaces, and bus connections. In access points 110-111, the microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disc drives, and/or the like. The memories store operating systems and network applications. The microprocessors execute the operating systems and network applications to wirelessly exchange user data with UE 101 over link 140 and link 141 and to exchange the user data with network controller 120 over links 142-143. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP).

Network controller 120 could be in an LTE core, 5G core, and/or some other type of network data center. Network controller 120 may comprises LTE and 5G network controllers, such as a Mobility Management Entity (MME) and or an Access and Mobility Management Function (AMFs). Network controller 120 comprises processing circuitry, memory circuitry, bus circuitry, transceivers and software. The processing circuitry executes operating systems and the network control software that are stored in the memory circuitry.

Data gateway 130 could be in an LTE core, 5G core, and/or some other type of data center. Data gateway 130 may comprise LTE and 5G data network elements, such as a Serving Gateway (S-GW), Packet Data Network Gateway (P-GW), Policy Control Rules Function (PCRF), Home Subscriber System (HSS), Authentication Server Function (AUSF), Unified Data Management (UDM), Session Management Function (SMF), User Plane Function (UPF), Policy Control Functions (PCF), Application Functions (AF), Network Repository Function (NRF), Network Slice Selection Function (NSSF), Network Exposure Function (NEF), and typically other network functions. Data gateway 130 comprises processing circuitry, memory circuitry, bus circuitry, transceivers and software. The processing circuitry executes operating systems and data network element software that are stored in the memory circuitry.

In operation, non-5GNR access point 110 exchanges attachment signaling with UE 101 and responsively exchanges network signaling with network controller 120. Non-5GNR access point 110 may transfer an attachment message for UE 101 to network controller 120 responsive to UE 101 wirelessly attaching to non-5GNR access point 110. The attachment message for UE 101 may include registration information, such as an International Mobile Subscriber Identifier (IMSI), International Mobile Equipment Identifier (IMEI), Internet Protocol Multimedia Public Identity (IMPU), Internet Protocol Multimedia Private Identity (IMPI), or some other user identification code. Non-5GNR access point 110 may transfer the attachment message including the registration information to network controller 120 over link 140.

In some examples, non-5GNR access point 110 may comprise an LTE eNodeB. In this example, network controller 120 may be an MME which communicates with an LTE eNodeB over an S1-MME signaling link. In other examples, network controller 120 comprises an AMF or a SMF. In this example, network controller 120 may communicate with an LTE eNodeB over an N2 signaling link.

In a next operation, network controller 120 exchanges the network signaling with non-5GNR access point 110 and exchanges bearer signaling with data gateway 130. Data gateway 130 then exchanges the bearer signaling with network controller 120. In some example scenarios, network gateway 130 comprises a P-GW. In yet another example, network gateway 130 comprises an S-GW. In yet another example, network gateway 130 comprises a UPF.

Data gateway 130 marks DL user data for UE 101 as non-5GNR DL user data and transfers the non-5GNR DL user data to non-5GNR access point 110. Data gateway 130 also marks additional DL user data for UE 101 as 5GNR DL user data and transfers the 5GNR DL user data to 5GNR access point 111. In some examples, data gateway 130 may mark the non-5GNR DL user data by marking DL General Packet Radio Services (GPRS) Tunneling Protocol (GTP-U) headers with a non-5GNR mark. In other examples, data gateway 130 may mark the 5GNR DL user data by marking DL GTP-U headers with a 5GNR mark.

In a next operation, non-5GNR access point 110 receives the non-5GNR DL user data and wirelessly transfers the non-5GNR DL user data to UE 101. 5GNR access point 111 also receives the 5GNR DL user data and wirelessly transfers the 5GNR DL user data to UE 101.

In a final operation, data gateway 130 tracks the transferred amount of the non-5GNR DL user data for UE 101 and the transferred amount of 5GNR DL user data for UE 101. In some example scenarios, data gateway 130 tracks the transferred amount of the non-5GNR DL user data for the UE and the transferred amount of 5GNR DL user data for the UE by performing a deep packet inspection to detect the markings. In other example scenarios, data gateway tracks the transferred amount of the non-5GNR DL user data for the UE and the transferred amount of 5GNR DL user data for the UE by generating an Attribute Value Pair (AVP) indicating the non-5GNR user data amount and generating another AVP indicating the 5GNR user data amount.

In some examples, non-5GNR access point 110 also marks Uplink (UL) user data from the UE as non-5GNR UL user data and transfers the non-5GNR UL user data to data gateway 130. Data gateway 130 then receives the non-5GNR UL user data and transfers the non-5GNR UL user data. Further in this example, data gateway 130 tracks the transferred amount of the non-5GNR UL user data for the UE.

In other examples, 5GNR access point 111 marks UL user data as 5GNR UL user data and transfers the 5GNR UL user data to data gateway 130. Data gateway then receives the 5GNR UL user data and transfers the 5GNR UL user data. Further in this example, data gateway 130 tracks the transferred amount of the 5GNR UL user data for UE 101.

In another example scenario, data gateway 130 tracks the transferred amount of the non-5GNR UL user data for UE 101 and the transferred amount of 5GNR UL user data for UE 101 by performing a deep packet inspection to detect the markings. In another example scenario, non-5GNR access point 110 marks the non-5GNR UL user data by marking UL GTP-U headers with a non-5GNR mark and 5GNR access point 110 marks the 5GNR UL user data by marking UL GTP-U headers with a 5GNR mark.

Advantageously, wireless communication system 100 enhances a user's experience when tracking and reporting non-5GNR user data tonnage exchanged over non-5GNR access point 110 and 5GNR user data tonnage exchanged over 5GNR access point 111. Another technical effect which may be appreciated from the present disclosure is the ability for network controllers (e.g., MMEs, AMFs, or SMF) and data gateways (e.g., S-GWs, P-GWs, and UPFs) to track non-5GNR and 5GNR data usage by the user at a subscriber level, and determine which devices usage should be throttled to reflect the node type usage by the user. This can be critical in determining and controlling the capacity of the network elements and therefore, optimize the necessary resources spent for each of the non-5GNR and 5GNR usages.

Figure 2:
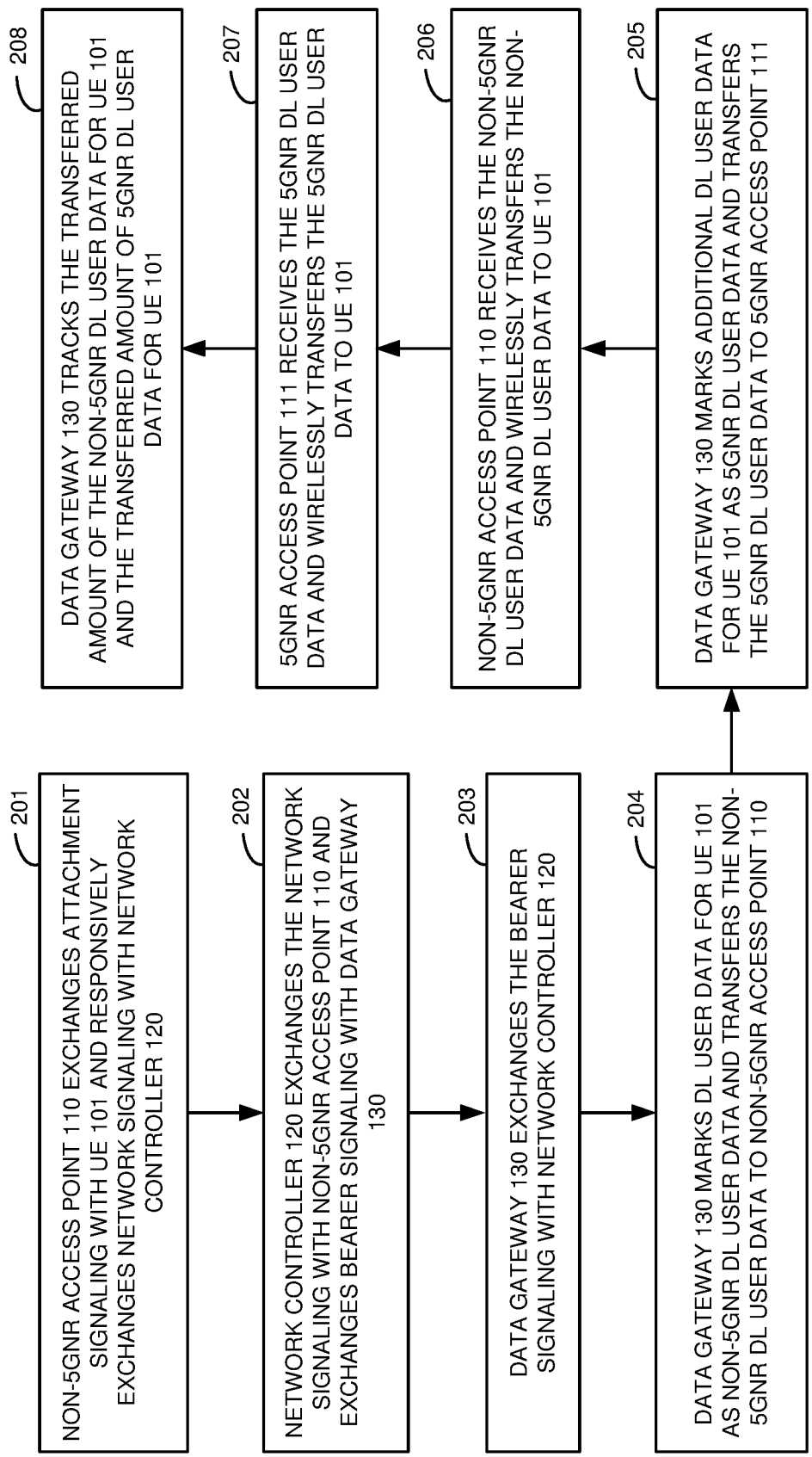
FIG. 2 illustrates an operation of the wireless communication system to serve a UE over a 5GNR access point and a non-5GNR access point.

FIG. 2 illustrates the operation of a wireless communication system to serve a UE over a 5GNR access point and a non-5GNR access point. In a first operation, non-5GNR access point 110 exchanges (201) attachment signaling with UE 101 and responsively exchanges (201) network signaling with network controller 120. Network controller 120 exchanges (202) the network signaling with non-5GNR access point 110 and exchanges (202) bearer signaling with data gateway 130. Data gateway 130 exchanges (203) the bearer signaling with network controller 120. Data gateway 130 marks (204) DL user data for UE 101 as non-5GNR DL user data and transfers (204) the non-5GNR DL user data to non-5GNR access point 110. Data gateway 130 marks (205) additional DL user data for UE 101 as 5GNR DL user data and transfers (205) the 5GNR DL user data to 5GNR access point 111. Non-5GNR access point 110 receives (206) the non-5GNR DL user data and wirelessly transfers (206) the non-5GNR DL user data to UE 101. 5GNR access point 111 receives (207) the 5GNR DL user data and wirelessly transfers (207) the 5GNR DL user data to UE 101. Data gateway 130 tracks (208) the transferred amount of the non-5GNR DL user data for UE 101 and the transferred amount of 5GNR DL user data for UE 101.

Figure 3:
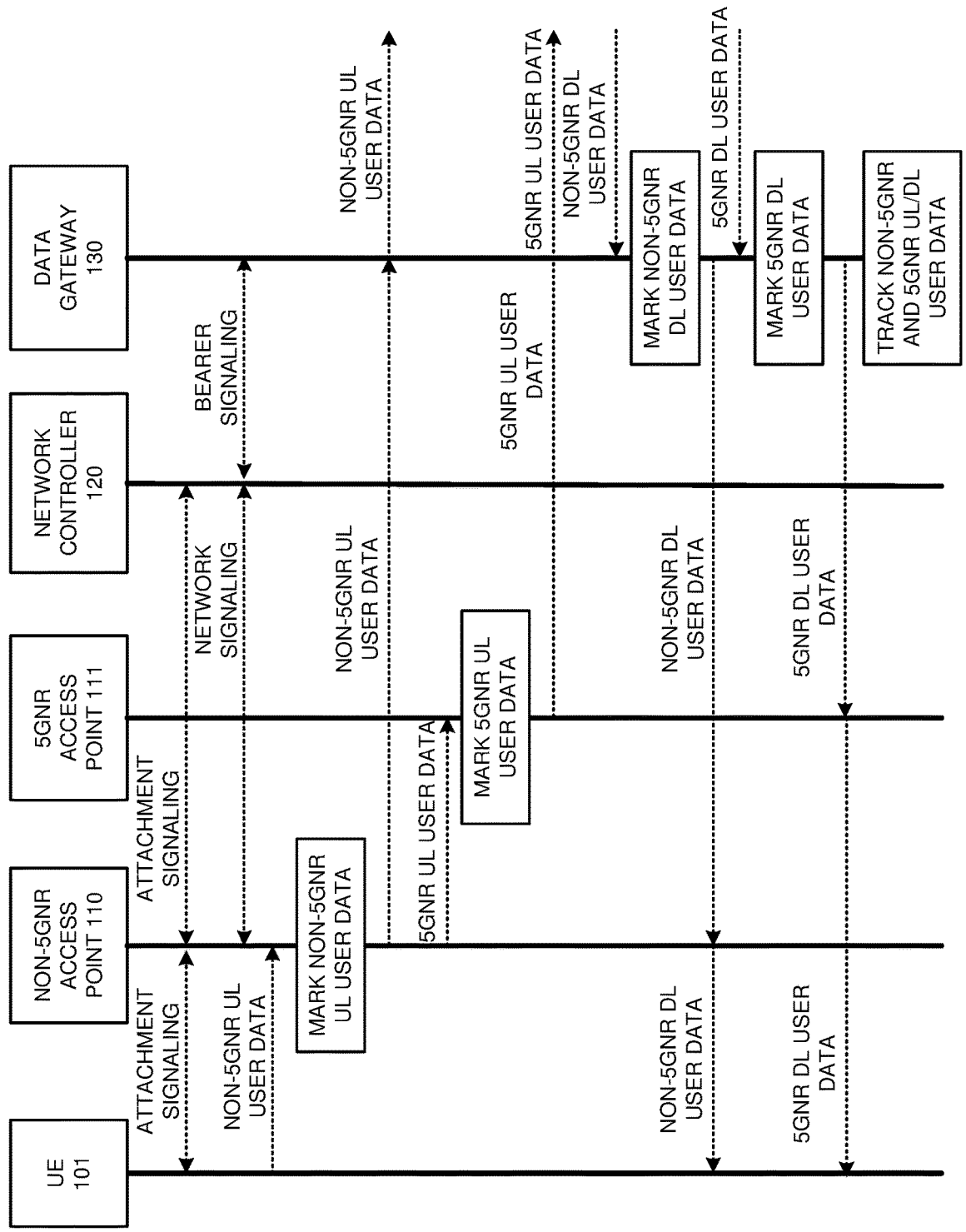
FIG. 3 illustrates an operation of the wireless communication system to serve a UE over a 5GNR access point and a non-5GNR access point.

FIG. 3 illustrates an operation of the wireless communication system to serve a UE over a 5GNR access point and a non-5GNR access point. In a first operation, non-5GNR access point 110 exchanges attachment signaling with UE 101. Non-5GNR access point 110 then responsively exchanges network signaling with network controller 120. Network controller 120 exchanges the network signaling with non-5GNR access point 110. Network controller 120 also exchanges bearer signaling with data gateway 130.

In a next operation, data gateway 130 exchanges the bearer signaling with network controller 120. Non-5GNR access point 110 marks UL user data from UE 101 as non-5GNR UL user data and transfers the non-5GNR UL user data to data gateway 130. Data gateway 130 then receives the non-5GNR UL user data and transfers the non-5GNR UL user data. 5GNR access point 111 marks UL user data as 5GNR UL user data and transfers the 5GNR UL user data to data gateway 130. Data gateway then receives the 5GNR UL user data and transfers the 5GNR UL user data. Further in this example, data gateway 130 tracks the transferred amount of the 5GNR UL user data for UE 101.

At this point in the operation, data gateway 130 marks DL user data for UE 101 as non-5GNR DL user data. Data gateway 130 then transfers the non-5GNR DL user data to non-5GNR access point 110. Data gateway 130 also marks additional DL user data for UE 101 as 5GNR DL user data and transfers the 5GNR DL user data to 5GNR access point 111.

In response, non-5GNR access point 110 receives the non-5GNR DL user data and wirelessly transfers the non-5GNR DL user data to UE 101. 5GNR access point 111 receives the 5GNR DL user data and wirelessly transfers the 5GNR DL user data to UE 101. Data gateway 130 tracks the transferred amount of the non-5GNR DL user data for UE 101 and the transferred amount of 5GNR DL user data for UE 101. Data gateway 130 also tracks the transferred amount of the non-5GNR UL user data for the UE and the transferred amount of the 5GNR UL user data for the UE.

Figure 4:
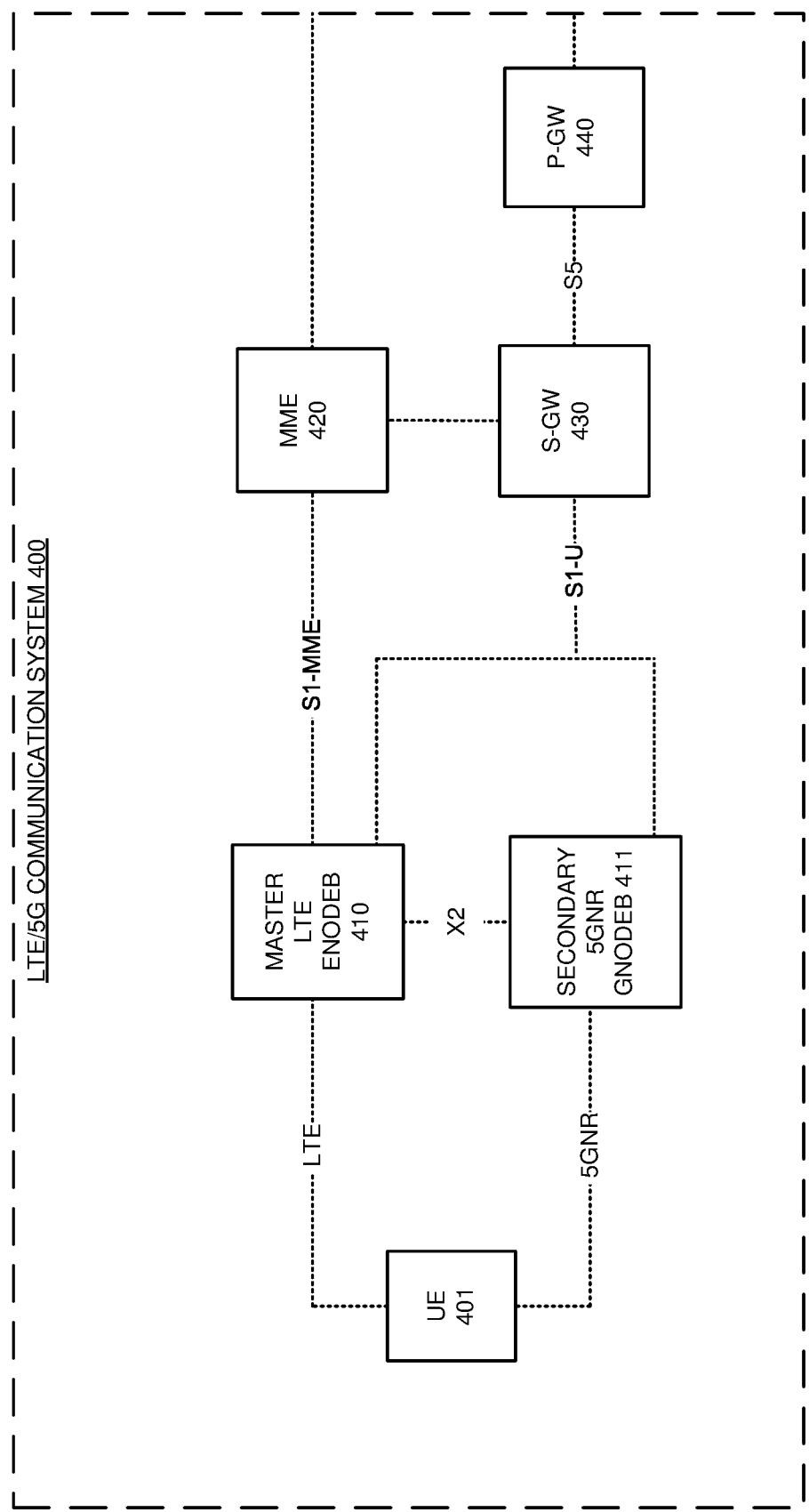
FIG. 4 illustrates a 5GNR/Long Term Evolution (LTE) network to serve a 5GNR/LTE UE over a master LTE eNodeB and a secondary 5GNR gNodeB.

FIG. 4 illustrates 5GNR/LTE network 400 to serve a 5GNR/LTE UE over a master LTE eNodeB and a secondary 5GNR gNodeB. LTE/5G communication system 400 is an example of wireless communication system 100, although system 100 may differ. LTE/5G communication system 400 comprises LTE/5GNR UE 401, master LTE eNodeB 410, secondary 5GNR gNodeB 411, MME 420, S-GW 430, and P-GW 440.

LTE/5GNR UE 401 is coupled to master LTE eNodeB 410 over an LTE link. LTE/5GNR UE 401 is coupled to secondary 5GNR gNodeB 411 over a 5GNR link. Master LTE eNodeB 410 and secondary 5GNR gNodeB 411 are coupled by X2 links. Master LTE eNodeB 410 and MME 420 are coupled over S1-MME links. Master LTE eNodeB 410 and S-GW 430 are coupled over S1-U links. Secondary 5GNR gNodeB 411 and S-GW 430 are also coupled over S1-U links. MME 420 and S-GW 430 are couple to one another and to other network elements which are omitted for clarity. S-GW 430 and P-GW 440 are coupled to one another over S5 links.

In operation, master LTE eNodeB 410 exchanges attachment signaling with LTE/5GNR UE 401 and responsively exchanges network signaling with MME 420. MME 420 exchanges the network signaling with master LTE eNodeB 410 and exchanges bearer signaling with S-GW 430. S-GW 420 exchanges the bearer signaling with P-GW 440 and MME 420.

Next, master LTE eNodeB 410 also marks UL user data from LTE/5GNR UE 401 as non-5GNR UL user data and transfers the non-5GNR UL user data to P-GW 440 over S-GW 430. P-GW 440 then receives the non-5GNR UL user data and transfers the non-5GNR UL user data. P-GW 440 tracks the transferred amount of the non-5GNR UL user data for LTE/5GNR UE 401.

Secondary 5GNR gNodeB 411 marks UL user data as 5GNR UL user data and transfers the 5GNR UL user data to P-GW 440 over S-GW 430. P-GW 440 then receives the 5GNR UL user data and transfers the 5GNR UL user data. P-GW 440 also tracks the transferred amount of the 5GNR UL user data for LTE/5GNR UE 401.

P-GW 440 marks DL user data for LTE/5GNR UE 401 as non-5GNR DL user data and transfers the non-5GNR DL user data to master LTE eNodeB 410. P-GW 440 also marks additional DL user data for LTE/5GNR UE 401 as 5GNR DL user data and transfers the 5GNR DL user data to secondary 5GNR gNodeB 411.

In a next operation, master LTE eNodeB 410 receives the non-5GNR DL user data and wirelessly transfers the non-5GNR DL user data to LTE/5GNR UE 401. Secondary 5GNR gNodeB 411 also receives the 5GNR DL user data and wirelessly transfers the 5GNR DL user data to LTE/5GNR UE 401. In a final operation, P-GW 440 tracks the transferred amount of the non-5GNR DL user data for LTE/5GNR UE 401 and the transferred amount of 5GNR DL user data for LTE/5GNR UE 401.

Figure 5:
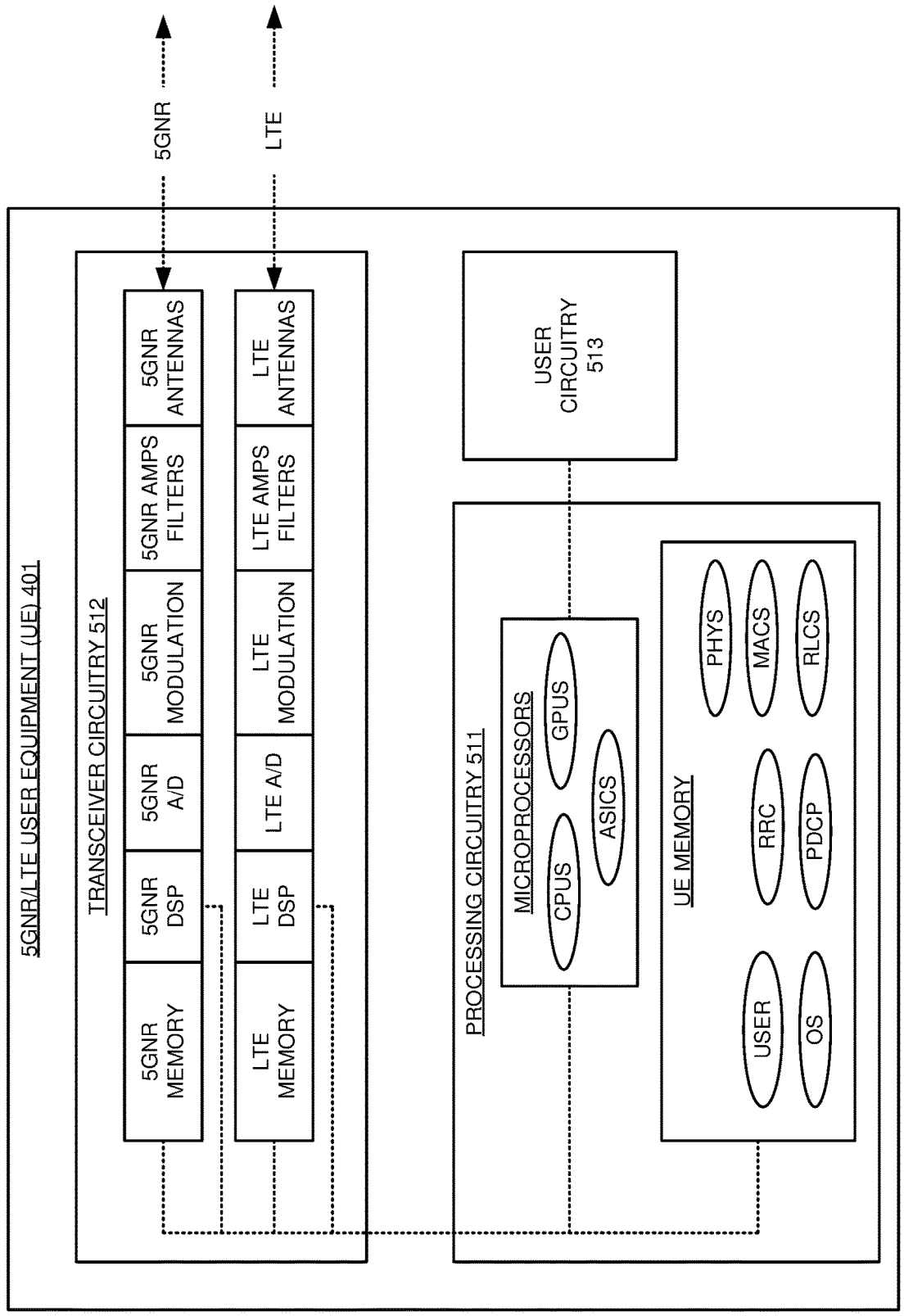
FIG. 5 illustrates the 5GNR/LTE UE that is served by the master LTE eNodeB and the secondary 5GNR gNodeB.

FIG. 5 illustrates an LTE/5GNR UE 401 that is served by master LTE eNodeB 410 or secondary 5GNR gNodeB 411. LTE/5GNR UE 401 is an example of UE 101, although UE 101 may differ. 5GNR/LTE UE 401 comprises processing circuitry 511, transceiver circuitry 512, and user circuitry 513 which are interconnected over bus circuitry. User circuitry 513 comprises graphic displays, machine controllers, sensors, cameras, transceivers, and/or some other user interface components. Transceiver circuitry 512 comprises radios for 5GNR, LTE, and WIFI. The radios each comprise antennas, amplifiers (AMPS), filters, modulation, analog/digital interfaces (A/D), Digital Signal Processors (DSP), and memory. The radios may share some of these components by using time diversity, frequency separation, and the like.

Processing circuitry 511 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system (OS), user applications, and network applications for 5GNR and LTE. The network applications comprise Physical Layer (PHY), Media Access Control (MAC), Radio Link Control (RLC), Packet Data Convergence Protocol (PDCP), and Radio Resource Control (RRC). The microprocessors execute the operating system, user applications, and network applications to exchange user data and network signaling with secondary 5GNR gNodeB 411 over the 5GNR link and with master LTE eNodeB 410 over the LTE link.

The user applications store UL user data and signaling in the UE memory. The network applications process the UL user data/signaling and DL network signaling to generate UL network signaling. The network applications transfer the UL user data and network signaling to the 5GNR and LTE memories in transceiver circuitry 512. In transceiver circuitry 512, the DSPs process the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless UL signals that transport the UL user data and network signaling to the wireless access nodes.

In the transceiver circuitry 512, the antennas receive wireless DL signals that transport user data and network signaling from the wireless access nodes. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL application data and network signaling. The microprocessors execute the network applications to store the DL user data and signaling in the UE memory. The user applications process their user data and signaling in the UE memory.

In processing circuitry 511, the 5GNR RRC maps between network signaling and SDUs. The LTE RRC maps between user data/network signaling and SDUs. The LTE/5GNR RRCs exchange their SDUs with the 5GNR PDCP and the LTE PDCP. The PDCPs map between the SDUs and Protocol Data Units (PDUs). The 5GNR/LTE PDCPs exchange the PDUs with the 5GNR RLC and LTE RLC. The RLCs map between the PDUs and MAC logical channels. The RLCs exchanges the application data and network signaling with the MACs over the MAC logical channels. The MACs map between the MAC logical channels and MAC transport channels. The MAC exchanges the application data and network signaling with the PHYs over the MAC transport channels. The PHYs map between the MAC transport channels and PHY transport channels. The PHYs exchange the application data and network signaling with PHYs in the wireless access nodes over the PHY transport channels.

RRC functions comprise authentication, security, handover control, status reporting, Quality-of-Service (QoS), network broadcasts and pages, and network selection. PDCP functions comprise security ciphering, header compression and decompression, sequence numbering and re-sequencing, de-duplication. RLC functions comprise Automatic Repeat Request (ARQ), sequence numbering and resequencing, segmentation and re-segmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 6:
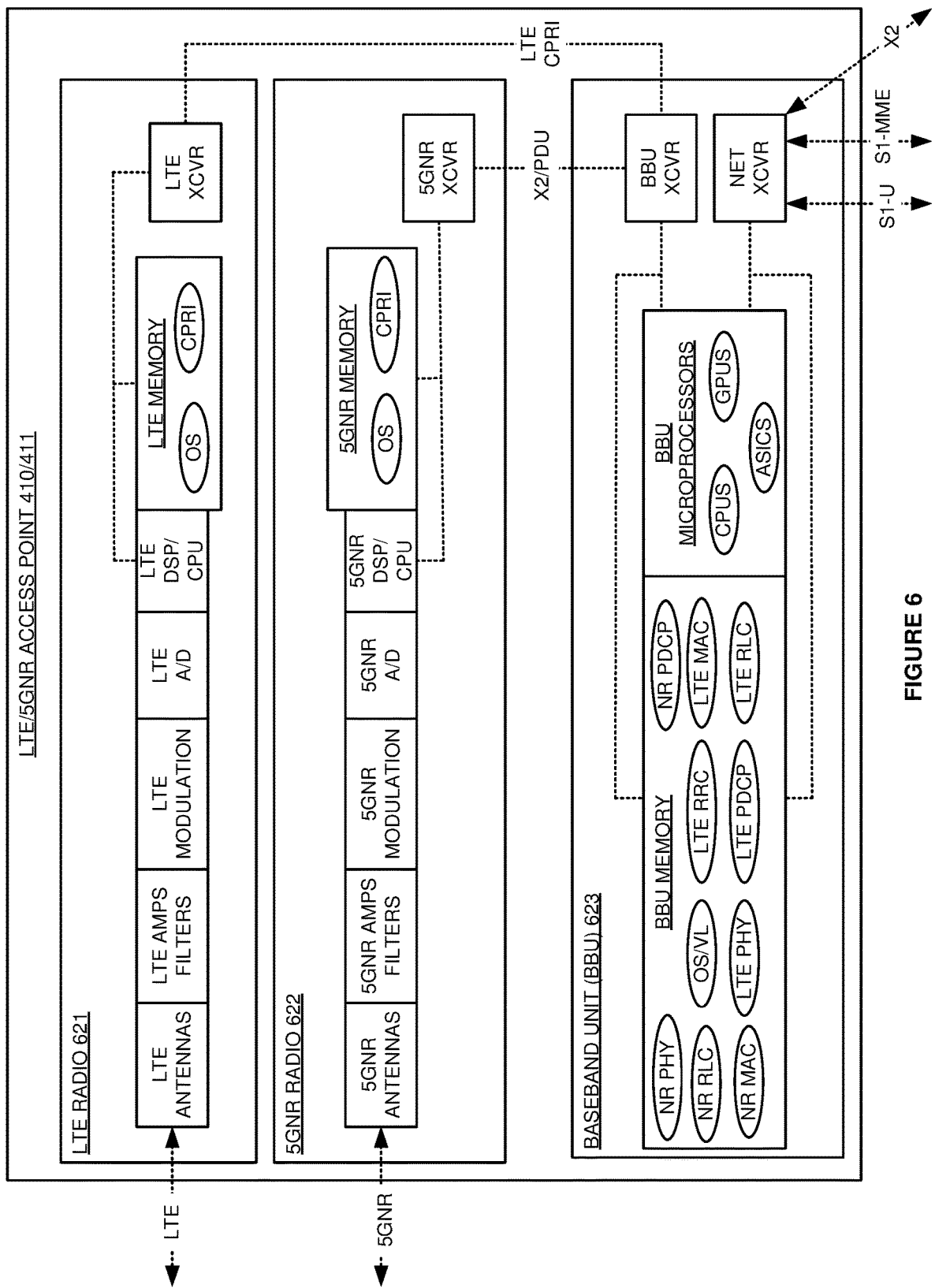
FIG. 6 illustrates the master LTE eNodeB and the secondary 5GNR gNodeB that serve the 5GNR/LTE UE.

FIG. 6 illustrates an LTE/5GNR access point that serves 5GNR/LTE UE 401. The LTE/5GNR access point comprises master LTE eNodeB 410 and secondary 5GNR gNodeB 411. Master LTE eNodeB 410/secondary 5GNR gNodeB 411 are represented by LTE and 5GNR. Access points 410-411 comprise an example of access points 110-111, although points 110-111 may differ. Master LTE eNodeB 410 comprises LTE radio 621 and Baseband Unit (BBU) 623. Secondary 5GNR gNodeB 411 comprises 5GNR radio 622. Radios 621-622 each comprise antennas, amplifiers/filters, modulation, A/D, DSP/CPU, memory, and transceivers (XCVR) that are coupled over bus circuitry. BBU 623 comprises BBU microprocessors, BBU memory, BBU transceivers, and network transceivers that are coupled over bus circuitry.

The antennas in LTE radio 621 are coupled to 5GNR/LTE UEs over wireless LTE links. The antennas in 5GNR radio 622 are coupled to the 5GNR/LTE UEs over wireless 5GNR links. The LTE transceivers in LTE radio 621 are coupled to the transceivers in BBU 623 over LTE Common Public Radio Interface (CPRI) links. The 5GNR transceivers in 5GNR radio 622 are coupled to the BBU transceivers in BBU 623 over X2 links. The network transceivers in BBU 623 are coupled to MMEs over S1-MME links. The network transceivers in BBU 623 are coupled to S-GWs over 51-U links. The network transceivers in BBU 623 are coupled to other wireless access nodes over X2 links.

In LTE radio 621, the LTE memory stores an operating system and network applications for CPRI. In 5GNR radio 622, the 5GNR memory stores an operating system and network applications for 5GNR PHY, MAC, and RLC. In BBU 623, the BBU memory stores an operating system, virtual layer (VIRTUAL LAYERS) components, and network applications. The virtual layer components comprise hypervisor modules, virtual switches, virtual machines, and/ or the like. The network applications include LTE PHY, LTE MAC, LTE RLC, LTE PDCP, LTE RRC, NR PHY, NR RLC, NR MAC, and NR PDCP. In other examples, radios 621-622 and BBU 623 may use other network application splits.

In radios 621-622, the antennas receive wireless UL signals from 5GNR/LTE UEs that transport user data and network signaling. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSPs recover UL symbols from the UL digital signals. In 5GNR radio 622, the 5GNR CPU executes the 5GNR PHY, MAC, and RLC to recover 5GNR PDUs from the UL symbols. The 5GNR transceivers transfer the UL 5GNR PDUs to the BBU transceivers in BBU 623 over the X2 links or PDU links. In LTE radio 621, the LTE DSP/CPU executes the LTE CPRI to format the UL LTE symbols for transmission. The transceivers transfer the UL 5GNR PDUs and the UL LTE symbols to the BBU transceivers in BBU 623 over the CPRI, X2, and PDU links.

In BBU 623, the BBU microprocessors execute the LTE PDCP and RRC to recover UL RRC data and RRC signaling from the UL 5GNR PDUs. The BBU microprocessors execute the LTE PHY, LTE MAC, LTE RLC, LTE PDCP, and LTE RRC to recover UL RRC data and RRC signaling from the UL LTE PDUs. The BBU microprocessors execute the LTE RRC to process UL/DL RRC data and RRC signaling to generate UL S1-U data, UL S1-MME signaling, DL RRC data, and DL RRC signaling. The network transceivers transfer the UL S1-U data to the LTE-SGWs over the S1-U links. The network transceivers transfer the S1-MME signaling to MMEs over the S1-MME links.

The network transceivers receive DL S1-MME signaling from the MMEs over the S1-MME links. The network transceivers receive DL S1-U data from the S-GWs over the S1-U links. The BBU microprocessors execute the LTE RRC to process the DL S1-MME signaling to generate DL RRC signaling and UL S1-MME signaling. The BBU microprocessors execute the LTE RRC, PDCP, RLC, MAC, PHY to process the DL S1-U data to generate DL LTE symbols. The BBU microprocessors execute the 5GNR PDCP to process the DL S1-U data to generate DL 5GNR PDUs. The BBU transceivers transfer the DL LTE symbols to LTE radio 621. The BBU transceivers transfer the DL 5GNR PDUs to 5GNR radio 622.

In LTE radio 621, the LTE CPU executes the LTE DSP to process the DL LTE symbols and generate corresponding digital DL signals for the LTE A/D. In 5GNR radio 622, the 5GNR CPU executes the 5GNR RLC, MAC, and PHY to process the DL PDUs to generate DL 5GNR symbols. The 5GNR DSP process the DL symbols to generate corresponding digital DL signals for the 5GNR A/D. In radios 621-622, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless DL signals that transport the DL data and signaling to the 5GNR/LTE UEs.

Figure 7:
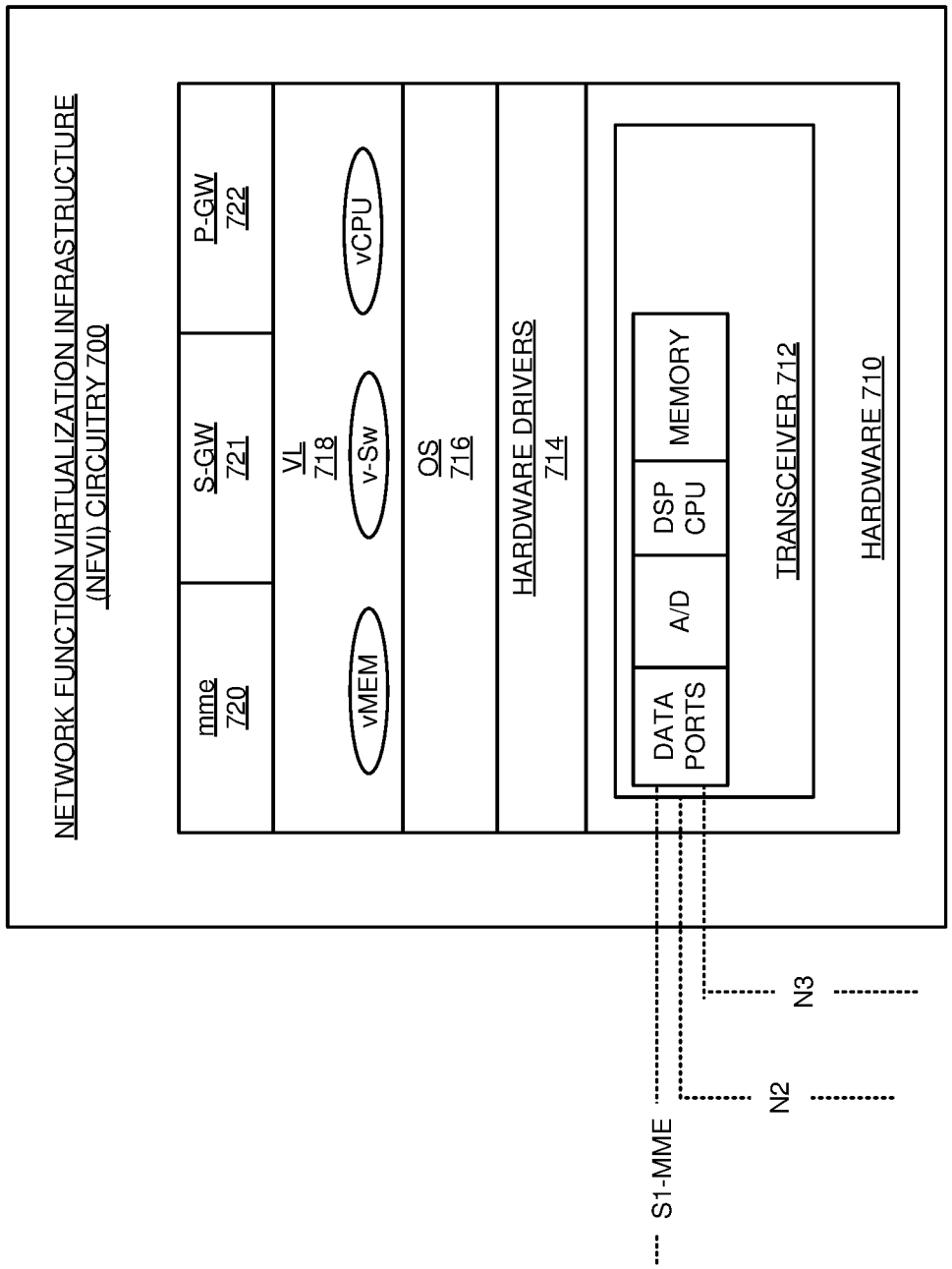
FIG. 7 illustrates an LTE/5G network core to serve 5GNR/LTE UEs over a master LTE eNodeB and the secondary 5GNR gNodeB.

FIG. 7 illustrates Network Function Virtualization Infrastructure (NFVI) circuitry 700 to serve 5GNR/LTE UE 401 over master LTE eNodeB 410 and secondary 5GNR gNodeB 411. NFVI 700 is an example of network controller 120, MME 420, data gateway 130, S-GW 430, and P-GW 440, although network controller 120, MME 420, data network element 130, S-GW 430, and P-GW 440 may differ. NFVI circuitry 700 comprises hardware 710, transceiver circuitry 712, hardware drives 714, operating system 716, and virtual layers 718. Virtual layers 718 comprises virtual memory, virtual switches, and virtual Central Processing Units (CPUs) to execute MME VNF 720 and S-GW VNF 721. Hardware 710 comprises volatile and non-volatile memories like flash, disc, tape, and the like. Operating system 716, virtual layers 718, and VNFs 720-721 are stored by memory circuitry. Operating system 716, virtual layers 718, and VNFs 720-721 are executed by processing circuitry. Transceiver circuitry 712 comprises memory, DSP, CPU, analog-to-digital interface, and data ports. The data ports in transceiver circuitry 712 communicate LTE/5GNR attachment messages with master LTE eNodeB 410 and secondary 5GNR gNodeB 411 over S1-MME links.

The processing circuitry executes operating systems 716 to drive hardware 710 and support virtual layers 718. The processing circuitry executes virtual layers 718 to support the network element applications. The virtual layers comprise virtual switches, virtual machines, hypervisors, and the like. In transceiver circuitry 712, the DSP/CPUs exchange data and signaling with the transceiver memory. The processing circuitry exchanges the data and signaling between the transceiver memory and memory circuitry. The processing circuitry executes VNFs 720-721 to process the data and signaling in memory circuitry.

Once LTE/5GNR UE 401 attaches, LTE/5GNR access points 410-411 exchange attachment signaling with LTE/5GNR UE 401 and responsively exchanges network signaling with MME VNF 720 over S1-MME signaling. In response, MME VNF 720 exchanges bearer signaling with S-GW VNF 721, such as S-GW 430. S-GW VNF 721 exchanges bearer signaling with P-GW VNF 722, such as P-GW 440. P-GW VNF 722 marks DL user data as non-5GNR user data then transfers the non-5GNR user data for LTE/5GNR UE 401 responsive to bearer signaling using over S5 signaling. P-GW VNF 722 also marks DL user data as 5GNR user data then transfers the 5GNR user data for LTE/5GNR UE 401. P-GW VNF 722 also tracking the transferred amount of the non-5GNR DL user data for LTE/5GNR UE 401 and the transferred amount of 5GNR DL user data for LTE/5GNR UE 401.

Figure 8:
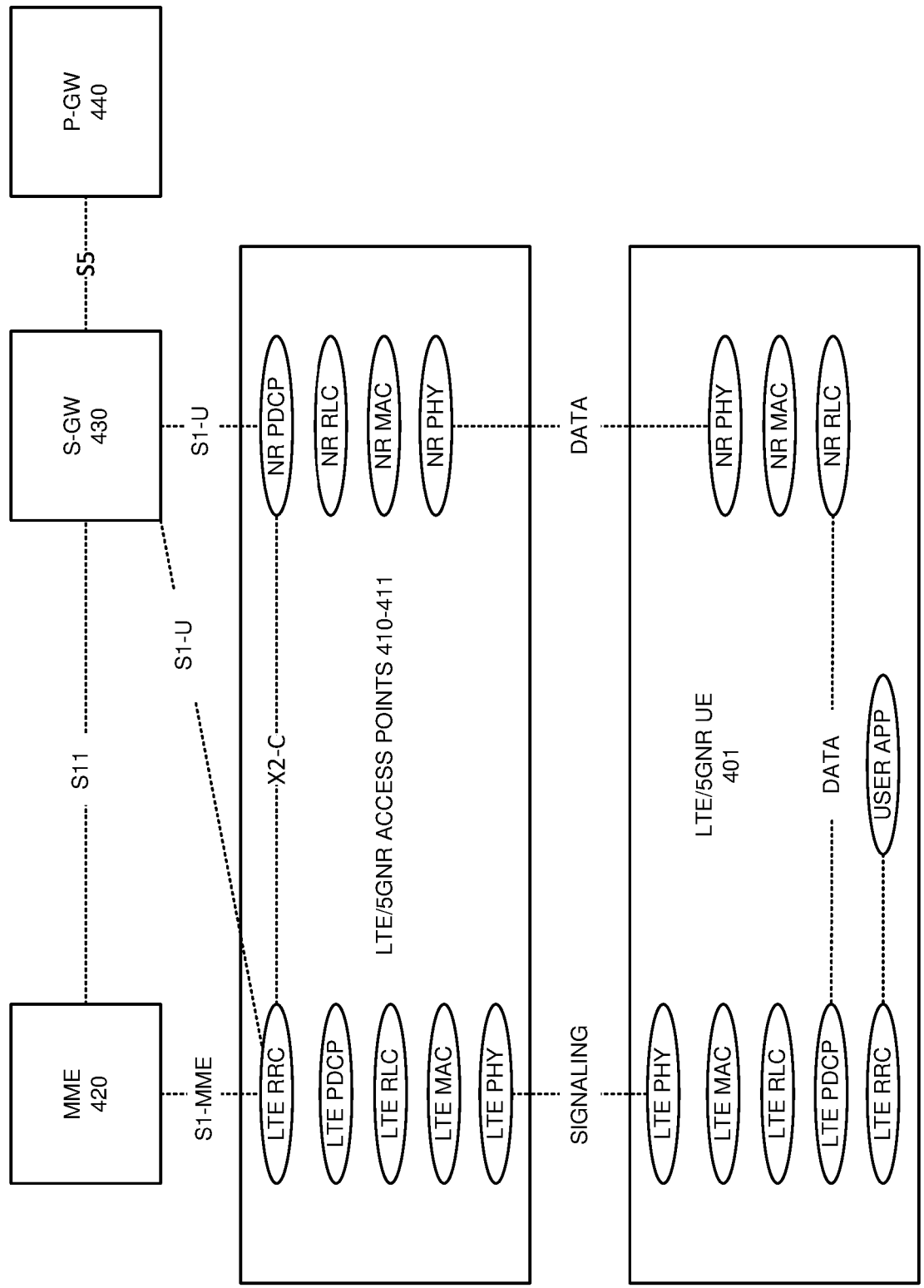
FIG. 8 illustrates an operation of the LTE/5G communication system to serve the LTE/5GNR UE over the master LTE eNodeB and the secondary 5GNR gNodeB.

FIG. 8 illustrates an operation of LTE/5G communication system 400 to serve LTE/5GNR UE 401 over LTE/5GNR access points 410-411. The LTE RRC in LTE/5GNR UE 401 attaches to the LTE RRC in LTE/5GNR access point 410 over the LTE PDCP, LTE RLC, LTE MAC, and the LTE PHY. The LTE RRC in LTE/5GNR access points 410-411 transfer an LTE attachment message for LTE/5GNR UE 401 to MME 420 over the S1-MME link. MME 420 transfers a create bearer request to S-GW 430 over S11 links. S-GW 430 sets up a bearer with P-GW 440 over S5 links. S-GW 430 transfers user data for LTE/5GNR UE 401 to the LTE RRC in LTE/5GNR access points 410-411 over an S1-U link responsive to the network signaling. The LTE RRC in LTE/5GNR access points 410-411 then exchange user data with the LTE RRC in LTE/5GNR UE 401 over the LTE PHYs, LTE MACs, LTE RLCs, and LTE PDCPs, in LTE/5GNR access points 410-411 and LTE/5GNR UE 401.

In a next operation, the LTE RRC in the LTE/5GNR UE 401 wirelessly attaches to the LTE RRC in LTE/5GNR access points 410-411 over the New Radio (NR) PHY, MAC, and RLC in LTE/5GNR UE 401 and the LTE RRC, PDCP, RLC, MAC, and PHY in LTE/5GNR access points 410-411. The LTE RRC in LTE/5GNR access points 410-411 transfers an attachment message to MME 420 over the S1-MME links responsive to LTE/5GNR UE 401 wirelessly attaching to LTE/5GNR access points 410-411.

S-GW 430 marks DL user data for the UE as non-5GNR DL user data and transfers the non-5GNR DL user data to LTE access point 410 over an S1-U. S-GW 430 also marks DL user data for the UE as 5GNR DL user data and transfers the 5GNR DL user data to 5GNR access point 411 over an S1-U. LTE/5GNR access points 410-411 then exchange the DL user data with LTE/5GNR UE 401 over the NR PDCPs, NR RLCs, NR MACs, and NR PHYs in LTE/5GNR access points 410-411 and LTE/5GNR UE 401. The NR RLC in LTE/5GNR UE 401 then exchanges the other data with the user application over the LTE PDCP and LTE RRC in LTE/5GNR UE 401.

S-GW 430 also tracks the transferred amount of the non-5GNR DL user data for the UE and the transferred amount of 5GNR DL user data for LTE/5GNR UE 401. S-GW 430 may also track the transferred amount of the non-5GNR UL user data for the UE and the transferred amount of 5GNR UL user data for LTE/5GNR UE 401.

The wireless data network circuitry described above comprises computer hardware and software that form special-purpose network elements that serve users with more efficient user message delivery. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network elements that serve users with more efficient user message delivery.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system comprising a Fifth Generation New Radio (5GNR) access point and a non-5GNR access point, the method comprising:
   the non-5GNR access point exchanging attachment signaling with User Equipment (UE) and responsively exchanging network signaling with a network controller;
   the network controller exchanging the network signaling with the non-5GNR access point and exchanging bearer signaling with a data gateway;
   the data gateway exchanging the bearer signaling with the network controller, marking Downlink (DL) user data for the UE as non-5GNR DL user data, transferring the non-5GNR DL user data to the non-5GNR access point, marking additional DL user data for the UE as 5GNR DL user data, and transferring the 5GNR DL user data to the 5GNR access point;
   the non-5GNR access point receiving the non-5GNR DL user data and wirelessly transferring the non-5GNR DL user data to the UE;
   the 5GNR access point receiving the 5GNR DL user data and wirelessly transferring the 5GNR DL user data to the UE; and
   the data gateway tracking the transferred amount of the non-5GNR DL user data for the UE and the transferred amount of 5GNR DL user data for the UE.

2. The method of claim 1 further comprising:
   the non-5GNR access point marking Uplink (UL) user data from the UE as non-5GNR UL user data and transferring the non-5GNR UL user data to the data gateway;
   the data gateway receiving the non-5GNR UL user data and transferring the non-5GNR UL user data; and
   the data gateway tracking the transferred amount of the non-5GNR UL user data for the UE.

3. The method of claim 2 further comprising:
   the 5GNR access point marking UL user data as 5GNR UL user data and transferring the 5GNR UL user data to the data gateway;
   the data gateway receiving the 5GNR UL user data and transferring the 5GNR UL user data; and
   the data gateway tracking the transferred amount of the 5GNR UL user data for the UE.

4. The method of claim 3 wherein the data gateway tracking the transferred amount of the non-5GNR UL user data for the UE and the transferred amount of 5GNR UL user data for the UE comprises performing a deep packet inspection to detect the markings.

5. The method of claim 3 wherein:
   the non-5GNR access point marking the non-5GNR UL user data comprises marking UL General Packet Radio Services (GPRS) Tunneling Protocol (GTP-U) headers with a non-5GNR mark; and
   the 5GNR access point marking the 5GNR UL user data comprises marking UL GTP-U headers with a 5GNR mark.

6. The method of claim 1 wherein the data gateway tracking the transferred amount of the non-5GNR DL user data for the UE and the transferred amount of 5GNR DL user data for the UE comprises performing a deep packet inspection to detect the markings.

7. The method of claim 1 wherein the data gateway tracking the transferred amount of the non-5GNR DL user data for the UE and the transferred amount of 5GNR DL user data for the UE comprises generating an Attribute Value Pair (AVP) indicating the non-5GNR user data amount and generating another AVP indicating the 5GNR user data amount.

8. The method of claim 1 wherein:
the data gateway marking the non-5GNR DL user data comprises marking DL General Packet Radio Services (GPRS) Tunneling Protocol (GTP-U) headers with a non-5GNR mark; and
the data gateway marking the 5GNR DL user data comprises marking DL GTP-U headers with a 5GNR mark.

9. The method of claim 1 wherein the network controller comprises at least one of a Mobility Management Entity (MME), an Access and Mobility Management Function (AMF), and a Session Management Function (SMF).

10. The method of claim 1 wherein the network gateway comprises at least one of a Packet Gateway (P-GW), Serving Gateway (S-GW), and User Plane Function (UPF).

11. A wireless communication system comprising a Fifth Generation New Radio (5GNR) access point and a non-5GNR access point, the wireless communication system comprising:
the non-5GNR access point configured to exchange attachment signaling with User Equipment (UE) and responsively exchange network signaling with a network controller;
the network controller configured to exchange the network signaling with the non-5GNR access point and exchange bearer signaling with a data gateway;
the data gateway configured to exchange the bearer signaling with the network controller, mark Downlink (DL) user data for the UE as non-5GNR DL user data, transfer the non-5GNR DL user data to the non-5GNR access point, mark additional DL user data for the UE as 5GNR DL user data, and transfer the 5GNR DL user data to the 5GNR access point;
the non-5GNR access point configured to receive the non-5GNR DL user data and wirelessly transfer the non-5GNR DL user data to the UE;
the 5GNR access point configured to receive the 5GNR DL user data and wirelessly transfer the 5GNR DL user data to the UE; and
the data gateway configured to track the transferred amount of the non-5GNR DL user data for the UE and the transferred amount of 5GNR DL user data for the UE.

12. The wireless communication system of claim 11 further comprising:
the non-5GNR access point configured to mark Uplink (UL) user data from the UE as non-5GNR UL user data and transfer the non-5GNR UL user data to the data gateway;
the data gateway configured to receive the non-5GNR UL user data and transfer the non-5GNR UL user data; and
the data gateway configured to track the transferred amount of the non-5GNR UL user data for the UE.

13. The wireless communication system of claim 12 further comprising:
the 5GNR access point configured to mark UL user data as 5GNR UL user data and transfer the 5GNR UL user data to the data gateway;
the data gateway configured to receive the 5GNR UL user data and transfer the 5GNR UL user data; and
the data gateway configured to track the transferred amount of the 5GNR UL user data for the UE.

14. The wireless communication system of claim 13 wherein the data gateway configured to track the transferred amount of the non-5GNR UL user data for the UE and the transferred amount of 5GNR UL user data for the UE comprises the data gateway configured to perform a deep packet inspection to detect the markings.

15. The wireless communication system of claim 13 wherein:
the non-5GNR access point configured to mark the non-5GNR UL user data comprises the non-5GNR access point configured to mark UL General Packet Radio Services (GPRS) Tunneling Protocol (GTP-U) headers with a non-5GNR mark; and
the 5GNR access point configured to mark the 5GNR UL user data comprises the 5GNR access point configured to mark UL GTP-U headers with a 5GNR mark.

16. The wireless communication system of claim 11 wherein the data gateway configured to track the transferred amount of the non-5GNR DL user data for the UE and the transferred amount of 5GNR DL user data for the UE comprises the data gateway configured to perform a deep packet inspection to detect the markings.

17. The wireless communication system of claim 11 wherein the data gateway configured to track the transferred amount of the non-5GNR DL user data for the UE and the transferred amount of 5GNR DL user data for the UE comprises the data gateway configured to generate an Attribute Value Pair (AVP) indicating the non-5GNR user data amount and generate another AVP indicating the 5GNR user data amount.

18. The wireless communication system of claim 11 wherein:
the data gateway configured to mark the non-5GNR DL user data comprises the data gateway configured to mark DL General Packet Radio Services (GPRS) Tunneling Protocol (GTP-U) headers with a non-5GNR mark; and
the data gateway configured to mark the 5GNR DL user data comprises the data gateway configured to mark DL GTP-U headers with a 5GNR mark.

19. The wireless communication system of claim 11 wherein the network controller comprises at least one of a Mobility Management Entity (MME), an Access and Mobility Management Function (AMF), and a Session Management Function (SMF).

20. The wireless communication system of claim 11 wherein the network gateway comprises at least one of a Packet Gateway (P-GW), Serving Gateway (S-GW), and User Plane Function (UPF).

* * * * *